United States Patent [19]
Tsudik

[11] Patent Number: 6,072,875
[45] Date of Patent: Jun. 6, 2000

[54] METHOD AND APPARATUS FOR SECURE IDENTIFICATION OF A MOBILE USER IN A COMMUNICATION NETWORK

[75] Inventor: Gene Tsudik, Santa Monica, Calif.

[73] Assignee: International Business Machines Corporation, Armonk, N.Y.

[21] Appl. No.: 08/845,796

[22] Filed: Apr. 25, 1997

Related U.S. Application Data

[63] Continuation of application No. PCT/EP94/03542, Oct. 27, 1994.

[51] Int. Cl.[7] ..................................................... H04M 1/66
[52] U.S. Cl. .......................... 380/270; 380/274; 455/410; 455/433
[58] Field of Search ..................................... 455/410, 415, 455/422, 433, 456, 461; 370/331, 350; 380/21, 23, 30, 43, 48, 49, 9, 239, 247, 248, 249, 258, 270; 713/182, 184, 185, 200

[56] References Cited

U.S. PATENT DOCUMENTS

| | | | |
|---|---|---|---|
| 5,204,902 | 4/1993 | Reeds, III et al. | 380/23 |
| 5,241,598 | 8/1993 | Raith | 380/21 |
| 5,377,267 | 12/1994 | Suzuki et al. | 380/23 |
| 5,390,245 | 2/1995 | Dent et al. | 380/23 |
| 5,455,863 | 10/1995 | Brown et al. | 380/23 |
| 5,481,611 | 1/1996 | Owens et al. | 380/25 |
| 5,592,555 | 1/1997 | Stewart | 380/49 |

*Primary Examiner*—Tod R. Swann
*Assistant Examiner*—Paul E. Callahan
*Attorney, Agent, or Firm*—Edward H. Duffield; Jack V. Musgrove; Andrew J. Dillon

[57] ABSTRACT

A method and an apparatus are provided for securely identifying a mobile user while avoiding trackability of his/her movements, i.e. it provides a way for a secure user identification in secrecy. The gist is to encrypt the user's identifier, and/or his/her password, and a synchronization indication, preferably a fixed time interval, under a secret one-way function and sending the encrypted message, called a "dynamic user identifier", to the user's "home authority" where he/she is registered. The home authority comprises correspondence tables listing, pre-computed for every time interval (or another chosen synchronization), the dynamic user identifiers and the corresponding true identity of the user and can thus quickly decide whether the received encrypted message originates from a registered user. On the other hand, an intruder is neither able to detect from the encrypted messages the identity of the user nor can he/she track a user's moves.

26 Claims, 3 Drawing Sheets

METHOD AND APPARATUS FOR SECURE IDENTIFICATION OF A MOBILE USER IN A COMMUNICATION NETWORK

CROSS-REFERENCE TO RELATED PATENT APPLICATION

The present invention is a continuation of Patent Cooperation Treaty Application No. PCT/EP94/03542 entitled "Method and Apparatus for Secure Identification of a Mobile User in a Communication Network" filed Oct. 27, 1994.

BACKGROUND OF THE INVENTION

1. Technical Field

The present invention relates in general to communication between mobile users of and in a computer network and in particular to a method and an apparatus for establishing a way of providing secure identification of a mobile user in a communication network.

2. Description of the Related Art

In today's communication networks, user mobility is rapidly becoming an important and popular feature, particularly in wireless or cellular networks. While useful and desirable, this increased user mobility leads to a number of important security-related issues and concerns. One issue is the approval or acceptance of the user; another issue is the tracking a mobile user's movements and current whereabouts.

A typical situation arising in mobile environments is when an entity, i.e. a user or a device, registered in a particular home domain, appears in a different, i.e. foreign domain. Presumably, this user's goal is to obtain certain services while in the foreign domain. Since this user is not known in the foreign domain, he/she must be authenticated and his/her "solvency" or good standing must be confirmed to the authority of the foreign domain. Within the following specification, this process is denominated "authentication", as usual in the art. Of course, the only entity able to comment on the user's identity and current standing is the authority in his/her home domain. There are several known solutions to this problem in the recent literature, some of them are addressed below. However, authentication is not the issue that the present invention addresses.

Of concern here is another security-related issue arising as a result of user mobility. It is the confidentiality of the user's identity and his/her movements. Ideally, only the user's home domain authority should be informed as to the mobile user's itinerary and current whereabouts. In the following, this process of establishing the identity of a mobile user, i.e. of determining who is trying to obtain a service from a particular domain actually, is denominated "identification".

Ideally, no entity other than the user himself/herself and a responsible authority in the user's home domain, i.e. the subnetwork or partition of the network within which the user typically works, should know the real identity and/or the current location of the mobile user. Current environments supporting user mobility either do not address the problem at all or base their solutions on hardware capabilities of the user's personal device.

Generally, one may say that the known solutions for this problem offered by current state-of-the-art mobile/cellular architectures are either inadequate or too specific to assure a secure identification in secrecy, as detailed below.

One of the presently available solutions is reported by M. Rahnema in (1). In this so-called GSM system, the mobile user is routinely assigned a temporary identity (TMSI, in GSM parlance) when he/she appears in a foreign domain. However, a TMSI is only assigned after the initial authentication of the mobile user in the foreign domain; in the process carried out by the latter, the user's real identity (IMSI, in GSM parlance) is communicated in the clear and can thus be recognized and misused by an intruder.

Another solution is described in a specification (2) on a "Cellular Digital Packet Data" (CDPD) system. The approach taken by the CDPD system is more secure than in the above GSM solution. In the CDPD system, before a mobile user communicates his/her identity, he/she engages in a Diffie-Hellman key exchange protocol with the local, i.e. foreign, domain authority. This protocol is described by W. Diffie and M. Hellman in (3). As a result, both parties come to share a secret key. Enciphered under this key, the mobile user subsequently transmits his/her identity to the foreign domain authority.

While more secure than GSM, this approach has two major drawbacks. First, it allows the local, i.e. foreign, domain authority to discover the real identity of the mobile user. In the context of CDPD, this is not a problem in and of itself. However, ideally, the identity of the mobile user should not be revealed to the local domain authority. It is sufficient for establishing his/her identity and current standing if it is corroborated or endorsed by the home domain authority. The second problem is due to the nature of the Diffie-Hellman key exchange protocol. Its purpose is to establish a secret key on-the-fly. This allows an intruder to masquerade as the local domain authority and thus to engage in the key exchange protocol with the mobile user and obtain a shared key. When the mobile user then transmits its real identity enciphered with this same key, an intruder will simply decipher the transmission.

Other approaches are given by R. Molva et al in (4) and by M. Beller et al in (5). One side aspect, relating to key distribution, is described in Applicant's PCT Application PCT/EP93/01989 (6), another side aspect, relating to password or key change, is addressed in Applicant's PCT Application PCT/EP93/02540 (7).

In summary, there are essentially three issues underlying the problem of mobile user identity and movement confidentiality.

The central issue in maintaining a secret identity is to prevent anyone from discovering a correspondence between a mobile user and a user registered in a particular home domain, in other words, the central issue is to keep the user's identity confidential. The easiest, rather intuitive solution is to assign a travelling alias to every mobile user or device when away from the home domain. As addressed below, this alias can be fixed or ever-changing. Consequently, a main object of the invention is to devise a method and a system that is adapted to and permits the use of such aliases.

The second important issue is to keep foreign domains "in the dark". If it is not imperative for a foreign domain to know the real user's identity, an alias should suffice. In most cases such an alias must still be corroborated by the home domain authority. Consequently, another object of the invention is to design a method and a system which enables the information to flow through the network without revealing the identity of the user to the foreign domain. (Whether or not aliases are used, there may be reasons why the foreign domain authority still demands to know the real identity of the user. In this case, the home domain authority may communicate the user's identity in secret, assuming, of course, that the two authorities have a pre-established means for secure communication. However, even in this case, the foreign domain originally does not know the user's identity.)

The third issue of particular concern is to prevent identity tracking or correlation. Even if a mobile user adopts a travelling alias, his/her movements can still be tracked by a hostile intruder. This is especially possible if the alias is fairly static, e.g. fixed for a given trip of a user or permanently allocated to said user. An alias of this latter type is similar to a long-term password; once cracked, the identity and the movements of the user can be compromised on a long-term basis. Consequently, a further object of the invention is to prevent the tracking by devising a system geared and adapted to use frequently changing aliases without inhibiting the information flow.

References (1) Rahnema: "Overview of the GSM System and Protocol Architecture", IEEE Communications Magazine, April 1993, Vol. 31, No. 4; pp. 92–101.

(2) "Cellular Digital Packet Data (CDPD) System Specification", Release 1.0, Jul. 19 1993, CDPD Industry Input Coordinator, Costa Mesa, Calif., USA.

(3) W. Diffie and M. Hellman: "New Directions in Cryptography", IEEE Transactions on Information Theory", November 1976, Vol. 22, No. 6, pp. 644–654.

(4) R. Molva, D. Samfat, G. Tsudik: "Authentication of Mobile Users", IEEE Network, Special Issue on Mobile Communications, Spring 1994, pp. 25–35.

(5) M. Beller, L. Chang, Y. Yacobi: "Privacy and Authentication on a Portable Communications System", IEEE JSAC, Special Issue on Wireless Personal Communications, August 1993, Vol. 11, No. 6, pp. 821–829.

(6) Patent Application PCT/EP93/01989, entitled "Method and Apparatus for Providing Secure Key Distribution in a Communication System", by IBM Corporation and P. Janson, G. Tsudik.

(7) Patent Application PCT/EP93/02540, entitled "Method and System for Changing an Authorization Password or Key in a Distributed Communication System", by IBM Corporation and R. Hauser, P. Janson, R. Molva, G. Tsudik, E. van Herreweghen.

(8) US National Bureau of Standards: "Federal Information Processing Standards", Publication 46, 1977.

(9) R. Rivest: "The MD5 Message Digest Algorithm", Internet RFC 1321, Internet Activities Board, April 1992.

(10) R. Molva and G. Tsudik: "Authentication Method with Impersonal Token Cards", 1993 IEEE Symposium on Research in Security and Privacy, May 1993, Proceedings published by IEEE Computer Society Press, Los Alamitos, Calif., USA.

(11) Security Dynamics Technologies, Inc., Cambridge, Mass., USA: "The ACE System Access Control Encryption", Product Information, 1992.

SUMMARY OF THE INVENTION

Communication between mobile users of and in a computer network is subject to a variety of security issues; user identification and user tracking are two particularly important ones. This invention provides a method and an apparatus for securely identifying a mobile user while avoiding trackability of his/her movements, i.e. it provides a way for a secure user identification in secrecy. The gist is to encrypt the user's identifier, and/or his/her password, and a synchronization indication, preferably a fixed time interval, under a secret one-way function and sending the encrypted message, herein called "dynamic user identifier", to the user's "home authority" where he/she is registered. The home authority comprises correspondence tables listing, pre-computed for every time interval (or another chosen synchronization), the dynamic user identifiers and the corresponding true identity of the user and can thus quickly decide whether the received encrypted message originates from a registered user. On the other hand, an intruder is neither able to detect from the encrypted messages the identity of the user nor can he/she track a user's moves.

The present invention presents a solution to the above described issues. In brief, to minimize or avoid traceability and identification of a mobile user, a method of assigning temporary, simple, one-time aliases to travelling users was devised, which is both efficient and not specific to a particular hardware. The invention allows, on one hand, for unambiguous and practically instantaneous identification of the travelling user by his home authority; on the other hand, an unauthorized party is unable to identify the mobile user or track his/her movements.

Though the invention addresses and provides a comprehensive solution for all three aspects discussed above, there are still some limitations that are difficult to circumvent. One such limitation, for example, is the need of the foreign domain authority to know the identity of the home domain of the travelling user. This is likely to be the case for quite a number of mobile-user environments, since charges incurred "abroad" must be eventually propagated to the home domain.

Furthermore, as mentioned before, only the home domain can comment on the user's current standing. (To solve this particular problem, one could envisage a system environment where communication between domain authorities is "anonymized" by a central clearinghouse. In this case, it would be beneficial to assign aliases to domains so that a travelling user can reference his/her home domain by an alias; it then would be up to the central clearinghouse to resolve the domain aliases.)

The method according to the invention tries to reconcile two seemingly conflicting requirements: authentication and identity confidentiality. To authenticate an entity, it must first claim a certain identity and subsequently show or prove that it knows something that only the actual bearer of that identity can possibly know. Identity confidentiality, on the other hand, demands that the same identity be kept secret. This results in a somewhat paradoxical situation which must be solved.

A central feature of the new method is in computing short-term travelling aliases, hereinafter called "dynamic user identifiers". A user travelling outside of his/her home domain can assume such an alias and hide all relationship to his real identity. Moreover, this remains to be the case even if the foreign domain (or any unauthorized party) manages to discover the travelling user's password.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Initially, every mobile user is assigned a long-term travelling alias $A_u$ in addition to his permanent identity. In principle, $A_u$ does not have to be different from the user's real identifier $U_x$; the security of the scheme does not depend on $A_u$ being secret. In an environment where each user is equipped with a smartcard or some similar device, $A_u$ may be nothing more than the serial number or any other unique identifier of the user's device. A list of these travelling aliases $A_u$ is maintained by the home domain authority alongside passwords and other user information.

For every domain $D_x$, a domain-wide time interval $\delta_x$ is selected. This time interval $\delta_x$ can be relatively coarse, for example an hour or a day.

When a user U, whose home domain is $D_x$, travels to a foreign domain $D_y$, he/she first needs to be identified (and authenticated). Subsequently, a temporary record can be created for him/her in $D_y$ to facilitate subsequent accesses in this foreign domain. In other words, if the user plans to linger within $D_y$ for some time, it may be advantageous to establish some temporary "home" for him instead of having to contact the user's home domain upon every access. But this is just one further possibility. The main goal of the invention is the identification of a user.

Figure 2:
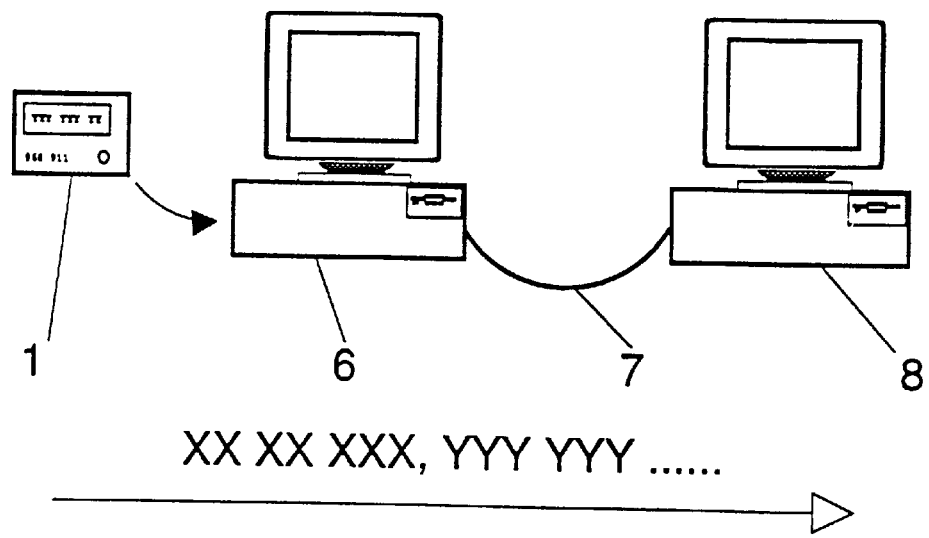
FIG. 2 is an example for the information flow from the smartcard to the user's home authority.

A detailed description of a protocol for authentication of a user can be found in Molva (4) which is herewith incorporated by reference. The exact format of the authentication flow is not important in the context of the present invention. Regardless of the authentication specifics, the identity of user U must be communicated to his/her home domain authority $AS_x$. Since user U cannot directly communicate with the home domain authority $AS_x$, all communication has to flow through the local authority $AS_y$. This is shown in FIG. 2, described further down.

The authentication protocol may be optionally preceded by a two-flow Diffie-Hellman key change as described in the above-cited CDPD System Specification (2). In this case, the entire procedure becomes resistant to passive intruders since all messages can be enciphered using the new key.

In general, the identification flow must include the dynamic user identifier SUid; this is true both for the (first) flow from the smartcard/user to the foreign authority $AS_y$ and the (second) flow from $AS_y$ to the user's home authority $AS_x$. The dynamic user identification may consist of SUid straightaway or, possibly, an encrypted version of SUid.

A crucial aspect of the protocol, with respect to the confidentiality of the user's identity, is the computation of the dynamic user identifier SUid; it is computed as: SUid= $F(A_u, T_u, PW_u)$ wherein F is a strong one-way function. Examples are DES described in Publication 46 of the National Bureau of Standards, cf. (8) above under "References", or MD5, disclosed by Rivest in (7). In case of DES or some other encryption-based function, it is important to note that no additional secret key is necessary to compute the function F since the user's password $PW_u$ is sufficient for that purpose. $T_u$ is the current time rounded to the nearest $\delta$ value. If the user is not equipped with a smartcard-like device, he enters his/her password $PW_u$ into the public workstation or other such terminal, i.e. the input device connected to the foreign domain authority $AS_y$. For a smartcard-bound user, $PW_u$ can be either: 1. a strong key within the smartcard (for those smartcards that lack a keypad or other means of input), or 2. a combination of the smartcard's key and the user's password (for smartcards with input capabilities).

As specified, the dynamic user identifier value SUid is unintelligible to the foreign domain authority $AS_y$. The only information that the foreign authority $AS_y$ is able to obtain is that the mobile user registered in the (home) domain $D_x$. In the second flow, the foreign domain authority $AS_y$ transmits SUid (along with other, e.g. authentication information) to the user's claimed home domain authority $AS_x$.

The issue is how the home domain authority $AS_x$ determines that SUid corresponds to the locally registered user U. It does so by maintaining an up-to-date table which, for each native user, lists the corresponding dynamic SUid value. This translation or reference table is re-computed every $\delta_x$ interval. Since the home domain authority $AS_x$ already stores the alias $A_u$ and the password $PW_u$ for every user, it has all the necessary information to compute up-to-date translation tables.

It should be noted that, since the dynamic user identifiers SUid do not depend on the users' current location, the translation tables can be pre-computed off-line and well in advance. This is particularly the case when a relatively coarse $\delta_x$ value is used, e.g. one hour or one day, as mentioned above.

Of course, establishing the "real" identity of the mobile user is only half the work; the home domain authority $AS_x$ must then verify the authentication information supplied in the second flow. However, this is unrelated to the problem at hand; as mentioned before, Molva et al describes an example in (4).

The following section addresses an advantageous arrangement to reduce the "computational overhead". In an environment where only few users travel outside their home domain, it can be quite inefficient and even wasteful to pre-compute, maintain, and search time-based alias tables for all users. In this case, a way to reduce overhead is to generally require a user U to inform his/her home domain authority $AS_x$ in advance of intended travelling. Thus, the home domain authority must keep track of only those users that are currently travelling. This does not necessarily imply that users need to disclose their complete itinerary in advance; they simply need to register the beginning of each trip "abroad", i.e. to a foreign domain. Upon notification, the home domain authority $AS_x$ adds the travelling user to a special list which is utilized for time-based dynamic identifier computation. However, it is not necessary for the user to inform his/her home domain authority $AS_x$ upon completion of each trip; the home domain authority can deduce that a certain user has returned home when this user tries to log in with his/her real, i.e. home user ID at the home domain authority.

In the following, the clock synchronization between the home domain authority and the foreign domain authority is addressed. The assumption about the user maintaining a coarse clock, loosely-synchronized with the home domain authority is certainly realistic for most environments.

Clearly, a user equipped with a smartcard can rely on the smartcard's clock to keep track of the user time $T_u$. For an "unequipped" user, a workstation's internal clock will suffice. It is also possible for the user to enter the time manually from a wall-clock or a wristwatch. Of course, the granularity of $\delta_x$ is decisive. Despite this obvious ease of maintaining the user time $T_u$, it is conceivable that in some cases, keeping track of $T_u$ is not possible for some reason.

To handle this situation, the protocol can be modified in a way that either, 1. the local (i.e. foreign) domain authority $AS_y$ provides the time $T_u$, or, 2. the user's home domain authority $AS_x$ provides it. In either case, the time must be supplied to the user (or his device) a priori, i.e., in an extra flow preceding the first flow as described above. This can be done in the open, i.e. in clear text, since the time $T_x$ is not a secret value.

To summarize, as demonstrated above, the most important factor in travelling incognito is to have frequently changing and seemingly unrelated aliases, i.e. dynamic user identifiers. As soon as constant or long-term identifiers are used, identity-correlation and tracking becomes possible. Ideally, an alias or dynamic identifier is fully disposable, i.e., use only once. The method according to the invention is not fully up to that standard because it allows aliases to be re-used within the configurable $\delta_x$ time interval. Consequently, if a user migrates through multiple domains within a single $\delta_x$ interval, he/she is vulnerable to some limited identity tracking.

To avoid this, the invention offers two alternative approaches:

1. the aliases are made dependent on the visited domain, or
2. tight synchronization between the user and his/her domain authority is maintained.

If the name of a foreign domain is included into the computation of a dynamic user identifier SUid, correlation of identity becomes impossible since a user migrating from one foreign domain to the next (even within a very short time, i.e. within a single time interval $\delta_x$) will do so under unrelated dynamic user identifiers. The main drawback of this approach is that it needs more time. Since, in this case, the home domain authority $AS_x$ is unable to predict its user's movements, it cannot pre-compute the translation tables. Thus, when the home domain authority $AS_x$ is presented with a dynamic user identifier SUid and the name of the foreign domain authority $D_y$, it is unable to resolve or interpret SUid immediately, and thus answer directly, since there is no pre-computed, stored translation table. Instead, for every registered user U, the home domain authority $AS_x$ has to compute the appropriate SUid value using the name of $D_y$ as one of the inputs. This puts a substantial load on the home domain authority $AS_x$.

The other possibility is to maintain tight synchronization between the user (or, rather, personal device of the user) and the home domain authority. This synchronization can be on the basis of time, secret sequence numbers or identically-seeded random number generators. This approach provides the highest level of security since it guarantees that an alias or dynamic user identifier is never reused. It suffers, however, from the same drawback as the domain-dependent aliases. Furthermore, it requires every user to have a reliable, tamper-proof personal device.

The described time-based aliases can be realized in device-oriented environments, e.g., smartcards, cellular telephones, or in more traditional environments where a travelling user has only a password for authentication. In the latter case, a user is unavoidably vulnerable to compromised public workstations or other impersonal end-user equipment which is used to access the network. One preferred example for the implementation of the invention is given below.

A particular advantageous application of the invention is in connection with smartcards. The simplest possible smartcard is the kind that has only a small display and, perhaps, an on/off switch. Inside its tamper-proof packaging, a smartcard maintains a clock and a secret key unique for each card. This type of smartcard was described by R. Molva et al in (10). A commercial product that could be adapted to work in this mode is the SecureID token described in (11).

Figure 1:
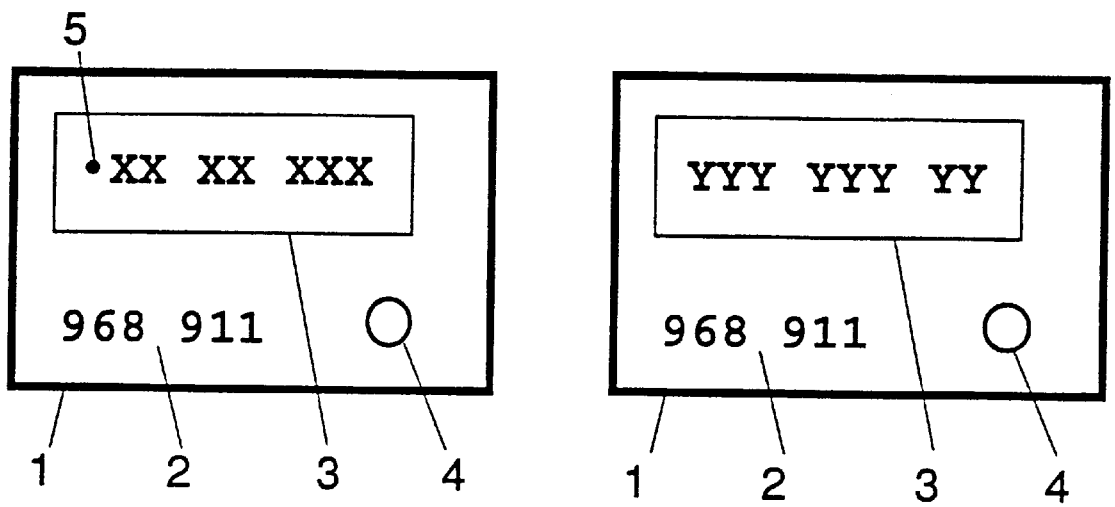
FIG. 1 is a smartcard, useable for this invention, in both of its modes.

Smartcard 1, shown in FIG. 1, comprises a serial number 2 which is usually fixed to the card and unique; it also comprises a processor and a display screen 3, often a small LCD, all battery powered. As explained below, smartcard 1 has two different modes; to support the time-based dynamic user identification method, the following features are provided:

Smartcard 1 is programmed to switch either automatically or on demand between two modes, an "authentication mode", wherein the card displays an authenticator (not of concern here, as explained above) and a "user ID mode", wherein the card displays the dynamic user identifier SUid. The automatic switching occurs every so often, e.g., every ten seconds. The automatically switched smartcard is particularly attractive since it does not require any surface or hardware modifications of presently available smartcards. Alternatively, a mode button or switch 4 can be provided that allows the user to switch between the two modes.

The smartcard's clock used in the authentication mode is "coarsened" when computing the user identification SUid. A separate clock for the user ID mode is not needed, but could still be provided.

In the user ID mode, smartcard 1 displays a 6–8 digit decimal number or other sequence of symbols, shown as XX XX XXX in FIG. 1, as the time-based dynamic user identifier. This user identifier may include a preceding mark 5 to indicate that the user identifier is shown. The user duly enters this as his "user ID" into the terminal or workstation for transmission to the foreign domain authority. As mentioned below, this input step can also be carried out automatically.

It should be clear at this point that the dynamic user identifier carries the user identification only in encrypted form; no intruder will be able to conclude from it the true identity of the user. It should further be clear that, since the dynamic user identifier is modified after a given time interval, any sequence of dynamic user identifiers is apparently unrelated to each other and gives no visible indication of belonging to the same user.

In the authentication mode, smartcard 1 displays another 6–8 digit decimal number or other symbol sequence, shown as YYY YYY YY in FIG. 1, as the user authenticator. The user enters this authenticator as his "password" into the terminal which in turn transmits it to the foreign domain authority. (The authentication process itself, as mentioned above, is no part of this invention and will thus not be described in further detail.)

Such a smartcard could be implemented by modifying a commercially available smartcard like the SecurID card referred to in (11) which apparently already includes a clock and a processor. For someone skilled in the art, the writing of the appropriate software—if necessary—and the adaptation of the card should not pose a problem. There is not even a physical modification of the card necessary if the automatic switching from user ID mode to authentication mode is selected.

FIG. 2 shows the transmission of the dynamic user identifier and the authenticator from smartcard 1 via the foreign domain authority 6 to the user's home domain authority 8.

One preferable way is that the user inputs both values from smartcard 1, as displayed. Another way is to read the card in a terminal connected to the foreign authority 6. The usual automatic teller machines as used extensively in the banking business could be modified to do that. (Of course, for authentication, the user may also have to enter a password, PIN number, or whatever means is used by the system for the authorization process. Again, as mentioned above, the authorization process is no part of this invention; any of the conventional methods can be used.)

The foreign domain authority 6 "knows" which home domain authority it has to address. This is preferably done by including an appropriate section into the dynamic user identifier. Alternatively, a separate input can be requested from the user by foreign domain authority 6 to identify the user's home authority.

The foreign domain authority 6 transfers the data via connection 7, indicated schematically in FIG. 2 as a cable, to the user's home domain authority. Of course, this can be anything from a two-wire connection to a radio or infrared communication network. An intruder deriving data from the foreign domain authority 6 or the connection 7 will not be able to detect the user's true identity or his/her previous place of access to the system.

Since the dynamic user identifier SUid is already encrypted, a further encryption for a more secure transmission is not necessary, but can of course still be provided.

Figure 3:
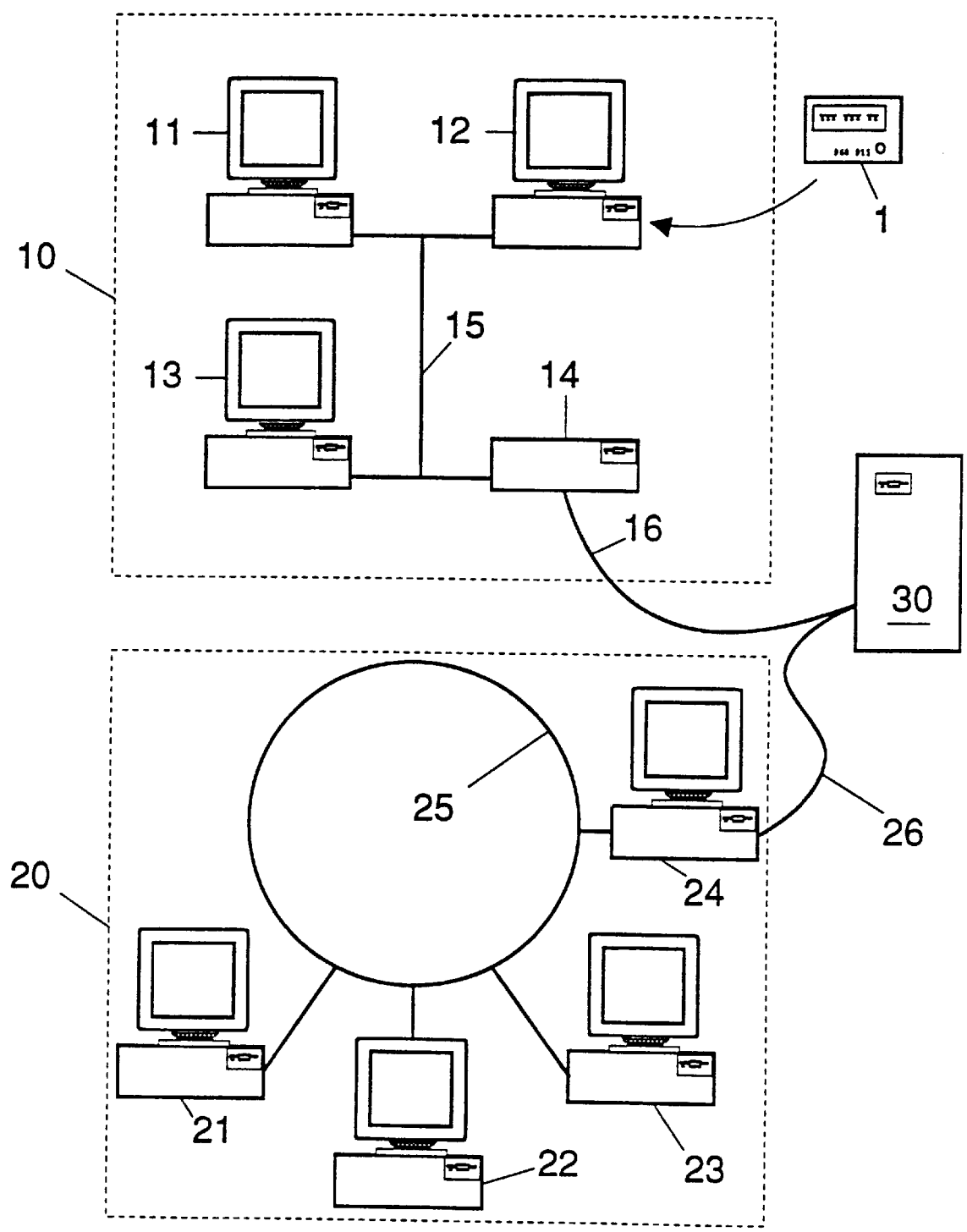
FIG. 3 is a network with two domains for demonstrating the use of the invention.

FIG. 3 shows a network consisting of two domains 10 and 20, each having a number of terminals or workstations for user access. The first domain 10 has a bus 15, connecting its user terminals 11 to 13 and a server 14. A link, here shown as a line or cable, connects server 14 to a gateway 30. Some or all of the terminals or workstations have built-in computing power. Also, the domain authority may be distributed and not located in a particular machine or server.

The second domain 20 also has a number of terminals or workstations 21 to 24, here connected to a token ring 25. At least workstation 24 has built-in computing power and is employed as a server for this second domain. Connection 26, shown as a line, can as well be a wireless infrared or radio connection to gateway 30.

A travelling user U who wants to access the system via terminal or workstation 12, and who is "at home" in domain 20, enters his/her data, i.e. identifier, password, etc., into a keyboard or other input device at terminal 12 and/or puts his/her smartcard into a reader at the workstation. Since workstation 12 is—from the user's viewpoint—part of a foreign domain, he/she will be asked to enter his/her home domain name or it will be read from the smartcard. Either workstation 12 or, alternatively, the user's smartcard compute the dynamic user identifier SUid, as described above. Foreign domain authority 14 receiving this dynamic user identifier is unable to interpret it. However, it must know the user's home domain, domain 20 in the present case, in order to route or transmit the encrypted data to the correct (home) domain via gateway 30.

Gateway 30—or any other gateway or relay station in the route—also is just able to interpret the user's correct home domain, but cannot read or interpret the dynamic user identifier SUid. In the present case, gateway 30 transmits the received encrypted user identifier to the user's home domain authority 24.

Domain authority 24, receiving the dynamic user identifier of its domiciled travelling user U has pre-computed up-to-date tables which list for the dynamic user identifiers for all its users, valid in the present time interval $\delta_x$. Thus, by a fast and easy table look-up, domain authority can check whether the received dynamic user identifier is valid and to which user it belongs. This is described in some more detail in connection with FIG. 4. Domain authority 24 may then return an appropriate message to terminal 12 (from where the user desired service) and/or go through the authentication process.

Figure 4:
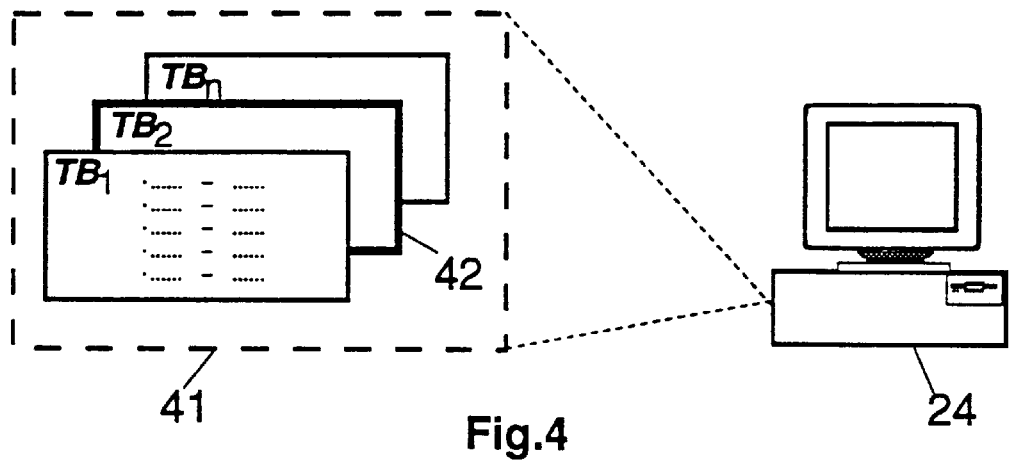
FIG. 4 is an example for the organization of the home authority's process.

As depicted in FIG. 4, when receiving a dynamic user identifier SUid, home domain authority 24 selects the appropriate alias table 42, say $TB_2$, from a series 41 of pre-computed tables $TB_1$ through $TB_n$ according to the current time interval $\delta_x$. It then searches the selected table using the supplied SUid value and identifies the serial number (or some other ID) of the smartcard or user workstation that computed SUid. The card serial number uniquely identifies the user. Once this identification is done, an appropriate message can be generated at domain authority 24.

Figure 5:
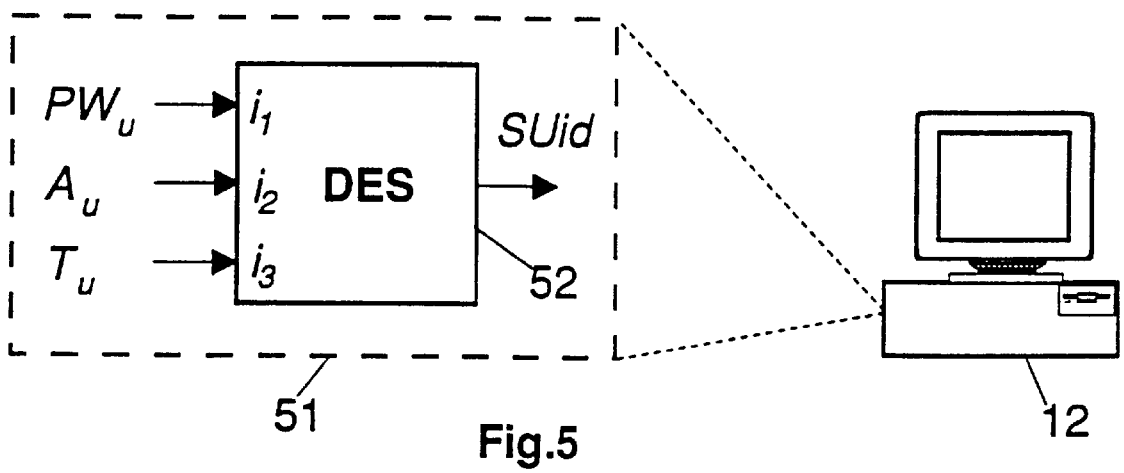
FIG. 5 is an example for the process at the foreign input workstation or terminal.

FIG. 5 finally shows an example how the user's input can be processed in the input terminal 12 in the foreign domain. User U inputs his user ID or identifier $A_u$, his password $PW_u$, and, optionally, the current time $T_u$, rounded to the nearest time interval $\delta_u$ into workstation or terminal 12 in the foreign domain. Processing means 51, including an encryptor 52, encrypts the user's inputs, i.e. $i_1$ through $i_3$, which correspond to $PW_u$, $A_u$, and $T_u$, as shown in the figure. Here, the concatenation of $i_1$ and $i_2$ is encrypted under DES, referred to above in (8), under the key $i_3$, determining SUid, which is sent to the user's home domain. There, authentication server 24 evaluates the received dynamic user identifier SUid.

The following is a stepwise description of the full process.

First, and preferably permanently, each (home domain) authentication authority $AS_x$, typically authentication server 24, computes the tables necessary for the process. This is done every so often, e.g., once a day. Thereby, a sequence of tables, e.g. $TB_1$, $TB_2$, $TB_n$, is computed, where n is the number of $\delta_x$ intervals in a day or other "long" time unit. For example, if $\delta_x$ is set to one hour, authentication server 24 computes 24 tables every day.

Each table $TB_i$, contains as many rows as there are users in the local domain. Each row consists of two columns:

user name U; and the result of applying one-way function $F(A_u, T_u, PW_u)$, where $PW_u$ is the password or PIN of user U and $T_i = T_o + i\delta_x$. $T_o$ is the absolute time at the beginning of the computation start, i.e., if computation is done every day, then $T_o$ is set to midnight.

This ends the first part of the process, i.e. the table computation. The following, second part concerns the identity resolution. To enable an easy understanding, it shall be described in several steps.

A user U travels to a foreign domain. At a terminal or workstation in this foreign domain, say terminal 12 of domain 10 in FIG. 3, he/she enters his/her user ID $U_x$ or alias $A_u$, the $\delta_x$ value, and his/her password (or PIN) $PW_u$ into the workstation. From the input values, the workstation (software and/or hardware) computes the dynamic user identifier SUid=$F(A_u, T_u, PW_u)$, where $T_u$ is the local time on the workstation, rounded off to the nearest $\delta_x$, i.e. seconds, minutes or hours, depending on what units $\delta_x$ is measured in. Note that it is not required for the workstation to have a clock; in that case, the user also enters the time $T_u$, e.g. by consulting his watch.

In addition, the user enters some authentication information into the workstation. It is not relevant to the present invention what this authentication information is.

The workstation sends the SUid value along with the authentication information to the user's home domain authority $AS_x$, e.g. to terminal (or workstation) 24 in domain 20. This may be done indirectly: workstation 12 can first forward the data to its own local authority $AS_y$, e.g. workstation 14 of domain 10 which, in turn, then sends the data on to $AS_x$, here terminal or workstation 24.

When the data reaches $AS_x$, i.e. workstation 24, it first obtains its local time $T_x$. Then, it computes $j=(T_x-T_o)/\delta_x$, using integer division, and $k=(T_x-T_o)\%\delta_x$, wherein % is the modulus operator. Next, $AS_x$, i.e. workstation 24, searches the table $TB_j$ (pre-computed in Step 0), using SUid as the search value.

If the search is successful, the table entry points to user U.

If the search is unsuccessful, domain authority $AS_x$, i.e. workstation 24, may (depending on the value of k) search either $TB_{j-1}$ or $TB_{j+1}$.

Once user U is identified, domain authority $AS_x$, i.e. workstation 24, verifies the authentication information that arrived along with a SUid, as known in the art. Again, details of this process are not relevant to the present invention.

When domain authority $AS_x$, i.e. workstation 24, is satisfied that SUid corresponds to a valid user U and the accompanying authentication information is correct, it responds to the remote domain authority $AS_y$, here server 14 in domain 10, and communicates that SUid is a legitimate user who is authorized to obtain service.

Obviously, the above-described process does not use a smartcard. If an "intelligent" card like smartcard 1 is to be used, the only change would be in Step 1. Instead of entering the info into the workstation, the user would simply read out the value displayed on the smartcard in its user ID mode and enter it into workstation 12. Alternatively, this value can be machine-read by workstation 12. This value is the SUid already computed by smartcard 1 in the same way as the workstation does it in Step 1 above.

To summarize, at the end of Step 6, domain authority $AS_y$, here workstation 12, can be assured that user U is a legitimate user while, at the same time, the domain authority does not and cannot discover the user's identity. In fact, domain authority only knows SUid which is nothing but a short-term alias. The correspondence between SUid $U_x$ and is known only to the user U and his/her home domain authority $AS_x$.

There are obviously many variations of this invention imaginable, ranging from wireless, e.g. radio or infrared, transmission to multiplexing when serving several users simultaneously. In a wireless domain, a single server could be used as transceiver and domain authority simultaneously. Synchronization can e.g. be achieved by radio-controlled clocks or other synchronization devices. Smartcards could be carrying any meaningful computing power in order to make the terminals as robust as possible. All these variations could still be using the essential principles of this invention as defined in the appended claims.

While the invention has been particularly shown and described with reference to a preferred embodiment, it will be understood by those skilled in the art that various changes in form and detail may be made therein without departing from the spirit and scope of the invention.

What is claimed is:

1. A method, within a communication system, for securely identifying a mobile user, said communication system including a plurality of users, a home domain associated with said mobile user, a foreign domain, and a synchronization indication, said synchronization indication utilizing a time interval indication to synchronize said mobile user's input within said foreign domain with said home domain, said mobile user having an identifier and a password, said method comprising the steps of:

deriving said synchronization indication from numbers located in said home domain, and available to said foreign domain;

encrypting said identifier, said synchronization indication, and said password utilizing an encryption function;

providing an identifier of said home domain to said foreign domain;

transmitting an encrypted message including said encrypted identifier, said encrypted synchronization indication, and said encrypted password to said home domain; and determining, within said home domain, an identity of said mobile user utilizing said encrypted message, said encryption function, and said synchronization indication in response to said transmitting step.

2. The method according to claim 1 wherein said encrypting step is performed within said foreign domain and said encrypted message is transmitted to said home domain for evaluation.

3. The method according to claim 1 wherein said communication system further includes a portable input means having resident computing power, said encrypting step comprising the steps of encrypting, within said portable input means, said identifier, said synchronization indication, and said password utilizing an encryption function; and inputting said encrypted identifier, said encrypted synchronization indication, and said encrypted password into said foreign domain.

4. The method according to claim 3 wherein said inputting step is at least partially performed directly from said portable input means.

5. The method according to claim 1, wherein said determining step further comprises transmitting an approval message from said home domain to said foreign domain if said identity is determined.

6. The method according to claim 1, wherein said encryption function is a one-way function, and said identifier is a secondary identifier of said mobile user, said encrypting step comprising the step of encrypting said identifier, said synchronization indication, and said password such that decryption of said encrypted message is only possible within said home domain.

7. The method according to claim 1, further comprising the steps of:

pre-computing, within said home domain, prior to a synchronization interval indication, one or more potential encrypted messages for use in a future time interval; and storing said pre-computed potential encrypted messages in a translation table.

8. The method according to claim 7, wherein said storing step comprises the step of selectively storing, for only those of said plurality of users known by said home domain to be requesting services from a foreign domain, said pre-computed potential encrypted messages in a translation table.

9. The method according to claim 1, further comprising the step of establishing for said home domain, a domain-wide time interval.

10. A communication system, for securely identifying a mobile user, said communication system including a plurality of users, a home domain, associated with said mobile user, a foreign domain, and a synchronization indication, said synchronization indication utilizing a time interval indication to synchronize said mobile user's input within said foreign domain with said home domain, said mobile user having an identifier and a password, said communication system comprising:

means for deriving said synchronization indication from numbers located in said home domain, and available to said foreign domain;

means for encrypting said identifier, said synchronization indication, and said password utilizing an encryption function;

means for providing an identifier of said home domain to said foreign domain;

means for transmitting an encrypted message including said encrypted identifier, said encrypted synchronization indication, and said encrypted password to said home domain; and means for determining, within said home domain, an identity of said mobile user, utilizing said encrypted message, said encryption function, and said synchronization indication in response to said transmitting means.

11. The communication system according to claim 10 wherein said means for encrypting are performed within said foreign domain and said encrypted message is transmitted to said home domain for evaluation.

12. The communication system according to claim 10 wherein said communication system further includes portable input means having resident computing power, said means for encrypting comprising:

means for encrypting, within said portable input means, said identifier, said synchronization indication, and said password utilizing an encryption function; and means for inputting said encrypted identifier, said encrypted synchronization indication, and said encrypted password into said foreign domain.

13. The communication system according to claim 12 wherein said means for inputting is at least partially performed directly from said portable input means.

14. The communication system according to claim 10, wherein said means for determining further comprises means for transmitting an approval message from said home domain to said foreign domain if said identity is determined.

15. The communication system according to claim 10, wherein said encryption function is a one-way function, and said identifier is a secondary identifier of said mobile user, said means for encrypting comprising means for encrypting said identifier, said synchronization indication, and said password such that decryption of said encrypted message is only possible within said home domain.

16. The communication system according to claim 10, further comprising:

means for pre-computing, within said home domain, prior to a synchronization interval indication, one or more potential encrypted messages for use in a future time interval; and means for storing said pre-computed potential encrypted messages in a translation table.

17. The communication system according to claim 16, wherein said means for storing comprises means for selectively storing, for only those of said plurality of users known by said home domain to be requesting services from a foreign domain, said pre-computed potential encrypted messages in a translation table.

18. The communication system according to claim 10, further comprising means for establishing for said home domain, a domain-wide time interval.

19. The communication system according to claim 10 further including portable input means, said communication system comprising:

an identifier for each said portable input means;

a synchronization indication means;

a processor for computing said encrypted message means for switching said portable input means between an identification mode and a user ID mode in which it computes said encrypted message; and means for displaying and entering said computed encrypted message into said foreign domain.

20. The communication system according to claim 19, wherein said switching means is a manual mode switch for switching said portable input means between said identification mode and said user ID mode.

21. A method, within a communication system, for securely identifying a mobile user, said communication system including a plurality of users, a home domain associated with said mobile user, a foreign domain, and a synchronization indication, said synchronization indication utilizing a time interval indication to synchronize said mobile user's input within said foreign domain with said home domain, said mobile user having an identifier and a password, said method comprising the steps of:

encrypting said identifier, said synchronization indication, and said password utilizing an encryption function;

providing an identifier of said home domain to said foreign domain;

transmitting an encrypted message including said encrypted identifier, said encrypted synchronization indication, and said encrypted password to said home domain; and determining, within said home domain, an identity of said mobile user utilizing said encrypted message, said encryption function, and said synchronization indication in response to said transmitting step, wherein said encryption function is a one-way function, and said identifier is a secondary identifier of said mobile user, said encrypting step comprising the step of encrypting said identifier, said synchronization indication, and said password such that decryption of said encrypted message is only possible within said home domain.

22. A method, within a communication system, for securely identifying a mobile user, said communication system including a plurality of users, a home domain associated with said mobile user, a foreign domain, and a synchronization indication, said synchronization indication utilizing a time interval indication to synchronize said mobile user's input within said foreign domain with said home domain, said mobile user having an identifier and a password, said method comprising the steps of:

pre-computing, within said home domain, prior to a synchronization interval indication, one or more potential encrypted messages for use in a future time interval;

storing said pre-computed potential encrypted messages in a translation table;

encrypting said identifier, said synchronization indication, and said password utilizing an encryption function;

providing an identifier of said home domain to said foreign domain;

transmitting an encrypted message including said encrypted identifier, said encrypted synchronization indication, and said encrypted password to said home domain; and determining, within said home domain, an identity of said mobile user utilizing said encrypted message, said encryption function, and said synchronization indication in response to said transmitting step.

23. A method, within a communication system, for securely identifying a mobile user, said communication system including a plurality of users, a home domain associated with said mobile user, a foreign domain, and a synchronization indication, said synchronization indication utilizing a time interval indication to synchronize said mobile user's input within said foreign domain with said home domain, said mobile user having an identifier and a password, said method comprising the steps of:

establishing for said home domain, a domain-wide time interval;

encrypting said identifier, said synchronization indication, and said password utilizing an encryption function;

providing an identifier of said home domain to said foreign domain;

transmitting an encrypted message including said encrypted identifier, said encrypted synchronization indication, and said encrypted password to said home domain; and determining, within said home domain, an identity of said mobile user utilizing said encrypted message, said encryption function, and said synchronization indication in response to said transmitting step.

24. A communication system, for securely identifying a mobile user, said communication system including a plurality of users, a home domain, associated with said mobile user, a foreign domain, and a synchronization indication, said synchronization indication utilizing a time interval indication to synchronize said mobile user's input within said foreign domain with said home domain, said mobile user having an identifier and a password, said communication system comprising:

means for encrypting said identifier, said synchronization indication, and said password utilizing an encryption function;

means for providing an identifier of said home domain to said foreign domain;

means for transmitting an encrypted message including said encrypted identifier, said encrypted synchronization indication, and said encrypted password to said home domain; and means for determining, within said home domain, an identity of said mobile user, utilizing said encrypted message, said encryption function, and said synchronization indication in response to said transmitting means, wherein said encryption function is a one-way function, and said identifier is a secondary identifier of said mobile user, said means for encrypting comprising means for encrypting said identifier, said synchronization indication, and said password such that decryption of said encrypted message is only possible within said home domain.

25. A communication system, for securely identifying a mobile user, said communication system including a plurality of users, a home domain, associated with said mobile user, a foreign domain, and a synchronization indication, said synchronization indication utilizing a time interval indication to synchronize said mobile user's input within said foreign domain with said home domain, said mobile user having an identifier and a password, said communication system comprising:

means for pre-computing, within said home domain, prior to a synchronization interval indication, one or more potential encrypted messages for use in a future time interval;

means for storing said pre-computed potential encrypted messages in a translation table;

means for encrypting said identifier, said synchronization indication, and said password utilizing an encryption function;

means for providing an identifier of said home domain to said foreign domain;

means for transmitting an encrypted message including said encrypted identifier, said encrypted synchronization indication, and said encrypted password to said home domain; and means for determining, within said home domain, an identity of said mobile user, utilizing said encrypted message, said encryption function, and said synchronization indication in response to said transmitting means.

26. A communication system, for securely identifying a mobile user, said communication system including a plurality of users, a home domain, associated with said mobile user, a foreign domain, and a synchronization indication, said synchronization indication utilizing a time interval indication to synchronize said mobile user's input within said foreign domain with said home domain, said mobile user having an identifier and a password, said communication system comprising:

means for establishing for said home domain, a domain-wide time interval;

means for encrypting said identifier, said synchronization indication, and said password utilizing an encryption function;

means for providing an identifier of said home domain to said foreign domain;

means for transmitting an encrypted message including said encrypted identifier, said encrypted synchronization indication, and said encrypted password to said home domain; and means for determining, within said home domain, an identity of said mobile user, utilizing said encrypted message, said encryption function, and said synchronization indication in response to said transmitting means.

* * * * *